(12) United States Patent
Thiele

(10) Patent No.: US 7,312,698 B2
(45) Date of Patent: Dec. 25, 2007

(54) MAGNETIC TRANSMITTER AND RECEIVER FOR A TIRE PRESSURE MONITORING SYSTEM

(75) Inventor: Steven R. Thiele, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 224 days.

(21) Appl. No.: 11/237,808

(22) Filed: Sep. 28, 2005

(65) Prior Publication Data

US 2007/0080794 A1  Apr. 12, 2007

(51) Int. Cl.
*B60C 23/00* (2006.01)
(52) U.S. Cl. .................. 340/442; 340/447; 340/448; 73/146; 73/146.3; 73/146.5
(58) Field of Classification Search ........... 340/442, 340/447, 448, 146, 146.3, 146.5; 73/146, 73/146.3, 146.5
See application file for complete search history.

(56) References Cited

U.S. PATENT DOCUMENTS 5,231,872 A * 8/1993 Bowler et al. ............. 73/146.5
5,889,464 A    3/1999 Huang
6,124,787 A    9/2000 Isakov et al.
6,175,302 B1   1/2001 Huang
6,362,732 B1   3/2002 Konchin et al.
6,775,632 B1   8/2004 Pollack et al.

\* cited by examiner

*Primary Examiner*—Daryl C Pope
(74) *Attorney, Agent, or Firm*—Rankin, Hill, Porter & Clark LLP; Christen Millard

(57) ABSTRACT

A vehicle tire pressure monitoring system and method is provided, the system including a tire pressure transducer affixed to either the tire or wheel of a vehicle. An electromagnet system is in electrical communication with the tire pressure transducer, the electromagnet system configured to generate pulses and transfer a single bit of data to a sensor system on the vehicle body upon each revolution of the tire or wheel. The sensor system in turn transfers the received bits to an electronic control unit wherein the code is converted into a read out for the vehicle operator. One or more bits within the code may be redundant checking bits or bits representing the status of the pressure transducer or electromagnet system.

18 Claims, 3 Drawing Sheets

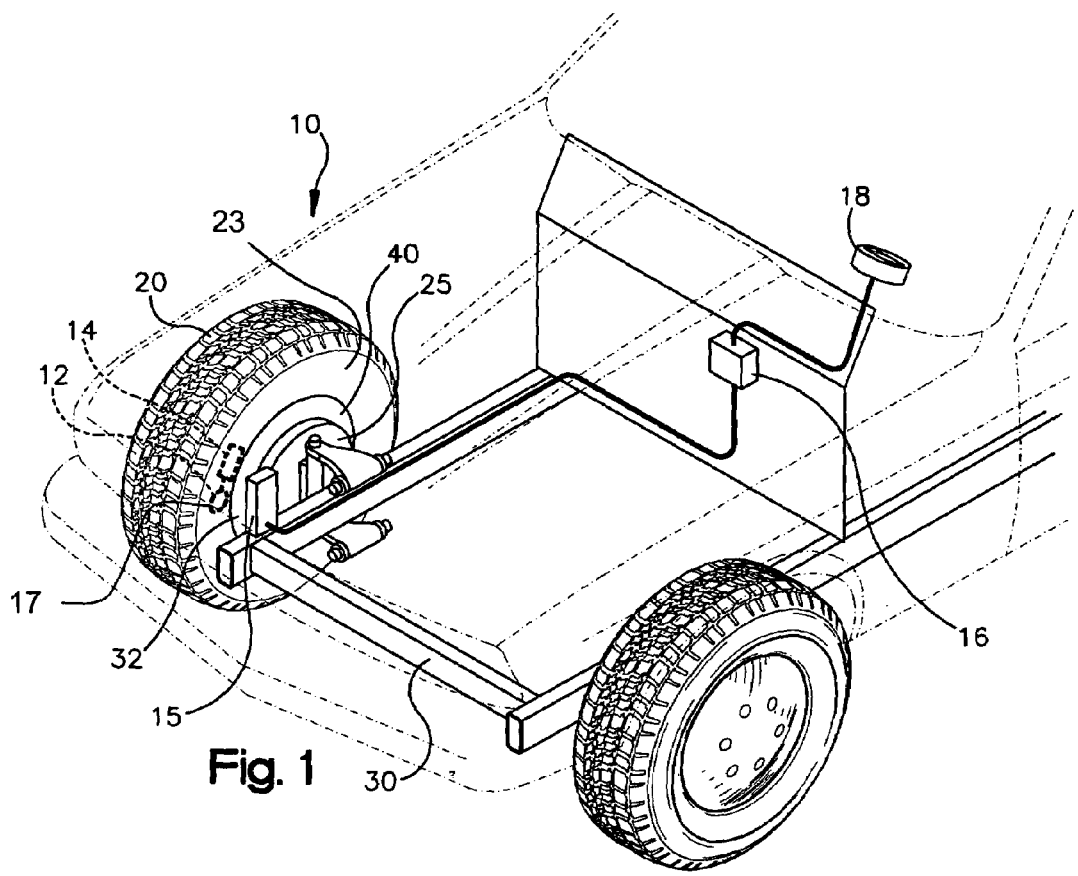
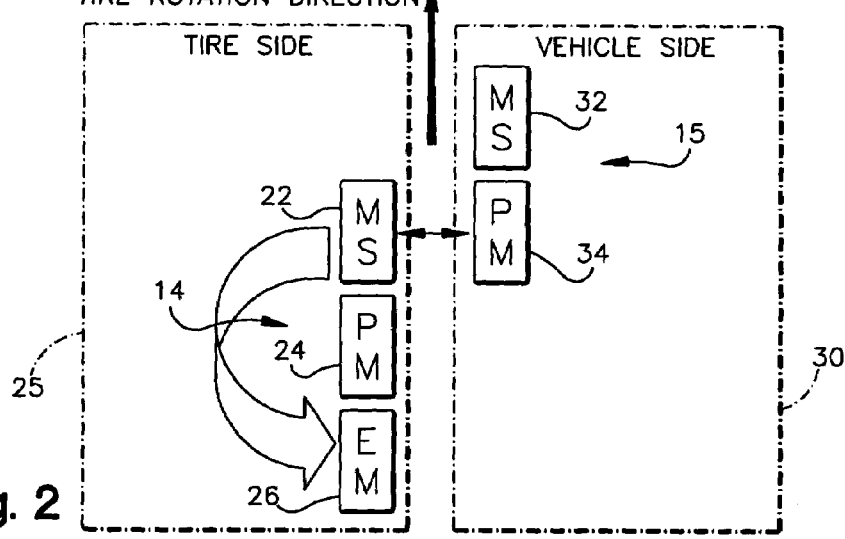

MAGNETIC TRANSMITTER AND RECEIVER FOR A TIRE PRESSURE MONITORING SYSTEM

BACKGROUND OF THE INVENTION

The present invention applies to motor vehicle components and more specifically to components that automatically measure tire pressure and warn the vehicle operator when the tire pressure reaches a dangerously low level.

Systems currently being used for automatic measurement of tire pressure include tire radius monitoring systems, common visual gauges, radio transmitter based systems and proximity transfer based systems. A radius monitoring system uses the vehicle's anti-lock braking system (ABS) to measure the changing radius of a vehicle tire. Logic within the ABS calculates a value for tire pressure based upon the measured tire radius. A radio transmitter based system includes a transmitter upon each vehicle wheel and a centralized receiver on the body of the vehicle.

As an example of a proximity transfer based system, U.S. Pat. No. 6,124,787 to Isakov et al., discloses a tire pressure monitoring system (TPMS) as installed in the drive train of a motor vehicle. The TPMS consists of four sensor transducers, each mounted to the inside or outside of a corresponding tire, and four receivers each mounted via brackets to the drivetrain at a distance of several centimeters away from the inner edge of the corresponding tire. The TPMS continuously monitors air pressure within each of the tires during motion of the motor vehicle through generation of an electromagnetic coupling between corresponding pairs of sensor transducers and receivers during an alignment that occurs between the transducers and receivers during each revolution of the tires. The sensor transducer is preferably mounted to an inner edge of the tire or on the rim of the tire and consists of a circuit including an inductor, a capacitor, and a switching element including a self-contained diaphragm, or sylfone for controlling the opening and closing of a switch.

A drawback to systems existing in the art are their cost and complexity. A simpler system is desirable. Also, there is a potential, in radio based transmission systems, for the radio signal from one wheel to be confused with the radio signal from a second wheel. Additionally, in existing proximity transfer systems, some or all of the signal being transferred can be lost or mistransferred.

BRIEF SUMMARY OF THE INVENTION

The present invention provides a simple, inexpensive system for continuously monitoring tire pressure from individual vehicle wheels. The system transfers a small amount of data with each revolution of the vehicle wheel. Data is transferred from each wheel or tire to the vehicle body and then to a centralized control unit.

The system includes a tire pressure transducer affixed to either the tire or wheel rim of a vehicle. An electromagnet system is in electrical communication with the tire pressure transducer. The electromagnet system includes a magnet sensor, permanent magnet and electromagnet. The electromagnet generates a pulse, upon each revolution of the vehicle tire, that is received by a sensor system. The sensor system is mounted to the body and includes a magnet sensor and permanent magnet. The sensor system transfers the received signals to an electronic control unit wherein the signals are converted back into pressure information for a read out for the vehicle operator and/or for other electronic devices within the vehicle.

Preferably, the pressure reading is received from the pressure transducer and converted into a seven bit code, each bit having a "1" or "0" status. An eighth bit is referred to as a checksum bit and indicates the type of information transmitted by the previous seven bits. Therefore, the first seven bits are either an indication of pressure or an indication of system operational status depending upon the status of the eighth or checksum bit. Finally if all eight bits have a null or "0" reading, the system is either malfunctioning or has no pressure or status data to send. Preferably, the seven bit code is transferred one bit at a time upon each revolution of the vehicle wheel. However, the electromagnet system may also include more than one electromagnet configured along the perimeter of the wheel or tire and as a result more than one bit may be transferred per revolution. One or more of the seven pressure or status bits can be a duplicate of a previous bit in order to check the accuracy of the previous bit. However, this substitution requires reducing the accuracy of the pressure value transmitted or the amount of status information transmitted.

The system is an improvement over the prior art. By transferring a single pulse of data of a size of one bit, there is less of a chance of error in transfer. Additionally, one or more of each eight pulses transferred may be a checking bit or status bit that help confirm the accuracy of the system. Additionally, the strength of the electromagnetic pulse is adjustable and can be optimized to offset electrical noise or tolerance, thereby making the system more robust compared to frequency, stepped pulse, or signal modulation methods used to transfer pressure information.

These and other features, aspects and advantages of the present invention will be fully described by the following description, appended claims and accompanying drawings.

BRIEF DESCRIPTION OF THE SEVERAL VIEWS OF THE DRAWINGS

FIG. 1 is a perspective view of a vehicle including a vehicle tire pressure monitoring system according to the present invention;

FIG. 2 is a schematic representation of the vehicle wheel and body and components thereon first coming into close proximity with one another;

DETAILED DESCRIPTION OF THE INVENTION

Figure 3:
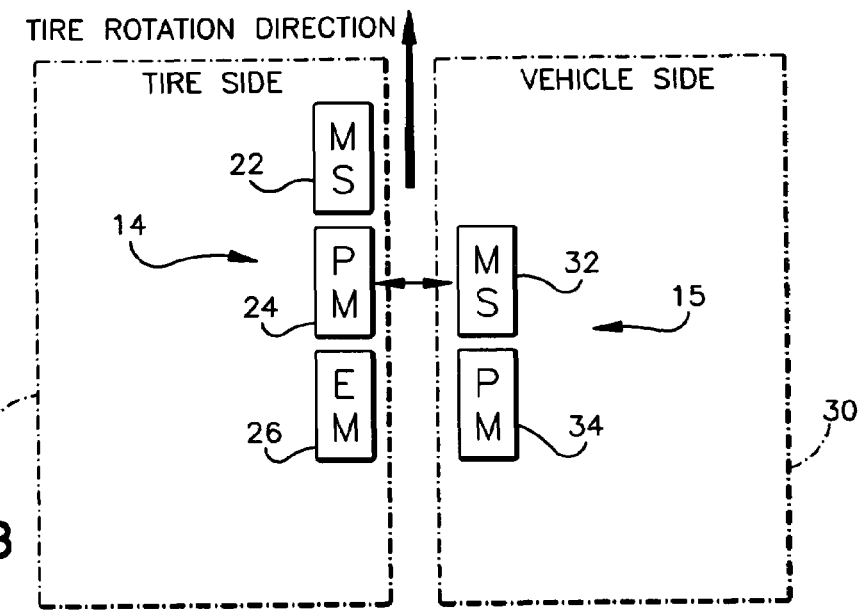
FIG. 3 is a schematic representation of the vehicle wheel and body and components thereon as the wheel advances from the position shown in FIG. 2.

Referring to FIG. 1, the present invention is directed to a vehicle tire pressure monitoring system 10 including a tire pressure transducer 12, an electromagnet system 14, sensor system 15 for receiving pulses from the electromagnet system 14, an electronic control unit (ECU) 16, and a display 18 for use on vehicles, specifically passenger cars, trucks, sport utility vehicles, etc.

The tire pressure transducer 12 measures the air pressure within a vehicle tire 20 and provides electrical output having a magnitude in proportion to the measured tire pressure. The pressure transducer 12 is any of a type known by those skilled in the art, such as a piezoelectric or Micro-Electro-Mechanical System (MEMS) transducer. Preferably, the pressure transducer 12 is contained within the tire and attached to the wheel rim 40. Alternatively, the pressure transducer 12 either penetrates the interior of the tire 20 or senses fluctuations in the shape of a designated portion of a tire wall 23 in order to measure tire pressure. The pressure transducer 12 generates a small voltage signal proportional to tire pressure. The pressure transducer 12 also includes an amplifier to amplify the voltage signal.

A pressure sensor central processing unit (CPU) 17 is a part of the transducer or is located adjacent to and in electrical communication with the transducer 12. The sensor CPU 17 converts the electronic signal from the pressure transducer into a series of bits.

Referring to FIGS. 1 and 2, the electromagnet system 14 includes a magnetic sensor 22, permanent magnet 24 and electromagnet 26, mounted sequentially on the vehicle wheel 25 or tire 20. As the tire 20 rotates, the components of the electromagnet system 14 pass a fixed point on the vehicle body in the following order: magnetic sensor 22, permanent magnet 24 and electromagnet 26. The electromagnet 26 is a simple device comprising a series of conductive windings. Preferably, the electromagnet system 14 and pressure transducer 12 are formed as a single unit attachable to the vehicle wheel rim 40 inside of the tire 20 adjacent to the inner tire wall 23.

Figure 4:
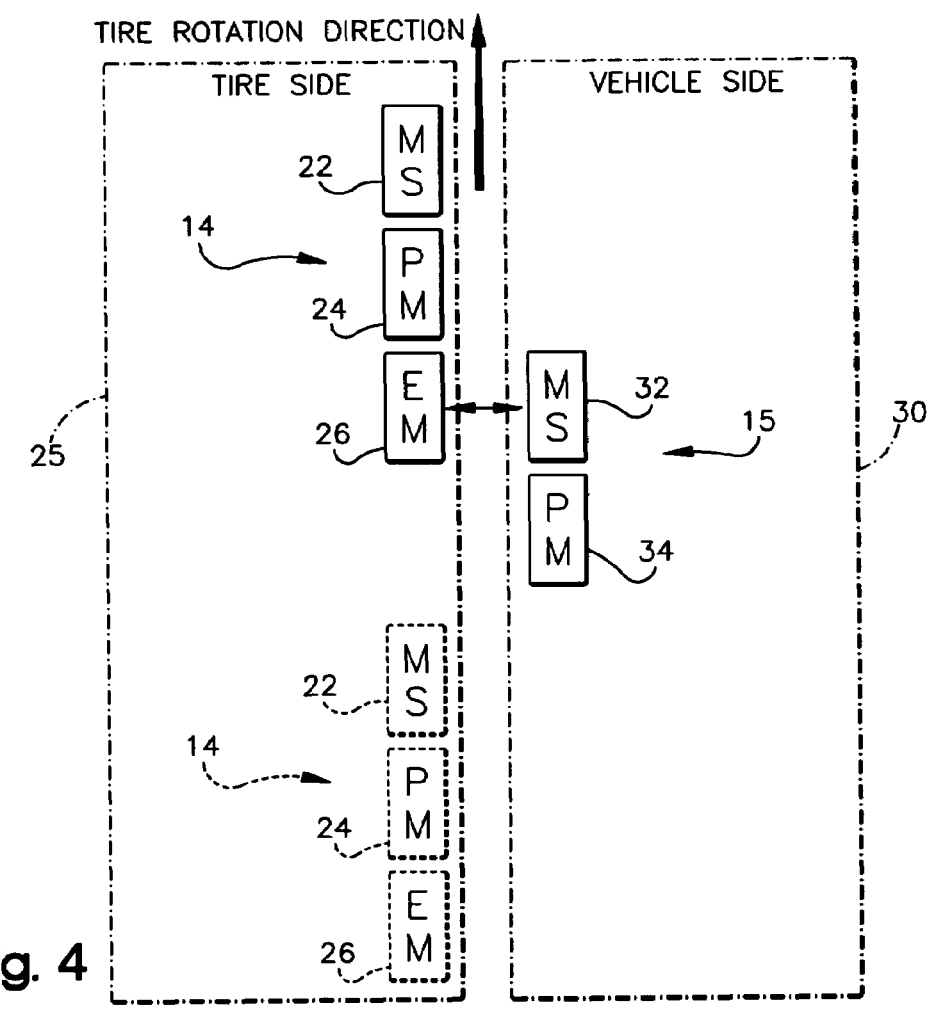
FIG. 4 is a schematic representation of the vehicle wheel and body and components thereon as the wheel advances from the position shown in FIG. 3.

Referring to FIG. 4, additional electromagnets 26 alone or in combination with additional magnet sensors 22 and permanent magnets 24 may be provided in order transfer more than one bit of information per revolution of the vehicle wheel 25.

The pressure transducer 12 and electromagnet 26 (shown in phantom) are preferably powered by a battery. Because the electromagnet 26 sends only one small pulse at a time, power depletion of the battery is small. As a result, the battery has a long life and does not require frequent recharging or replacement. A capacitor, which is charged by each tire rotation, could alternatively be used to power the pressure transducer 12 and electromagnet 26.

Referring to FIGS. 1 and 4, the pulse receiving sensor system 15 is mounted to the vehicle body 30 directly adjacent to the wheel rim 40. The receiving sensor system 15 includes a magnet sensor 32 and a permanent magnet 34 located sequentially. These components are located such that a point on the rotating tire 20 passes the permanent magnet 34 first and then the frame's magnet sensor 32.

The body's magnet sensor 32 has a receiving surface area that is greater than the transmitting surface area of the electromagnet 26. As a result, the timing of the pulse from the electromagnet 26 need not be exactly timed to the passing of the magnet sensor 32 and the pulse will still be received by the magnet sensor 32. The magnet sensor 32 is hard wired to the vehicle controls, including a conversion electrical control unit (ECU) 16.

The conversion ECU 16 may be a stand alone unit or be a part of a larger vehicle computer system. The conversion ECU 16 functions to convert a signal provided by the pulse receiving sensor system 15 into pressure information. The signal preferably is bits combined into code, but may be individual bits that the ECU 16 combines into code. The ECU 16 pressure information is sent as a signal to a display 18 that is visible to the vehicle operator. The display 18 is preferably a LED or LCD type display, but may also be a needle gauge or simple warning light. The signal of pressure information can also be forwarded to other electronic systems in the vehicle such as the anti-lock braking system and/or wheel torque distribution system. These systems may change operating parameters based on received tire pressure information.

The eight bits of data sent individually by the electromagnet 26 to the ECU 16 via the receiving sensor system 15 may be data bits, a checksum bit, checking bits, status bits or a combination thereof. Data bits provide an indication of the pressure measured by the tire pressure sensor. Preferably, at least seven of each set of eight bits are data bits. Checking bits are repetitions of one or more of the previously sent data bits. Status bits indicate operability, inoperability or malfunction of the pressure transducer, electromagnet system and/or battery that powers the transducer and electromagnet system. The checksum bit, preferably the eighth of a series of eight bits (also referred to as register 0), indicates whether the previous seven bits were data bits or status bits.

A combination of status bits (which may have up to 128 permutations) indicate system operational status parameters including: low battery, pressure out of range (too high or too low), a circuit fault in the electromagnet system, faulty transducer, voltage from a magnetic sensor is incorrect, the checksum bit is faulty, etc.

The power status of the battery may alternatively be determined by the pulse receiving sensor system 15 by measuring the strength of the pulse sent from the electromagnet. If all eight bits have a null or "0" reading, the system is either malfunctioning or has no pressure or status data to send. If all eight bits have a "1" reading, the system is indicating the system has cleared a fault.

Referring to FIGS. 1 and 2, the tire pressure monitoring system 10 is used to warn a vehicle operator of low pressure in the tires 20 of the vehicle. By receiving an early indication of a problem, the operator is able to prevent conditions that may compromise the structural stability of the vehicle tires 20 as well as provide conditions for better vehicle fuel economy. The monitoring system 10 of the present invention provides continuous monitoring of the vehicle tires 20 and as a result the vehicle operator no longer needs to stop the vehicle and measure tire pressure with a common visual tire gauge.

Figure 5:
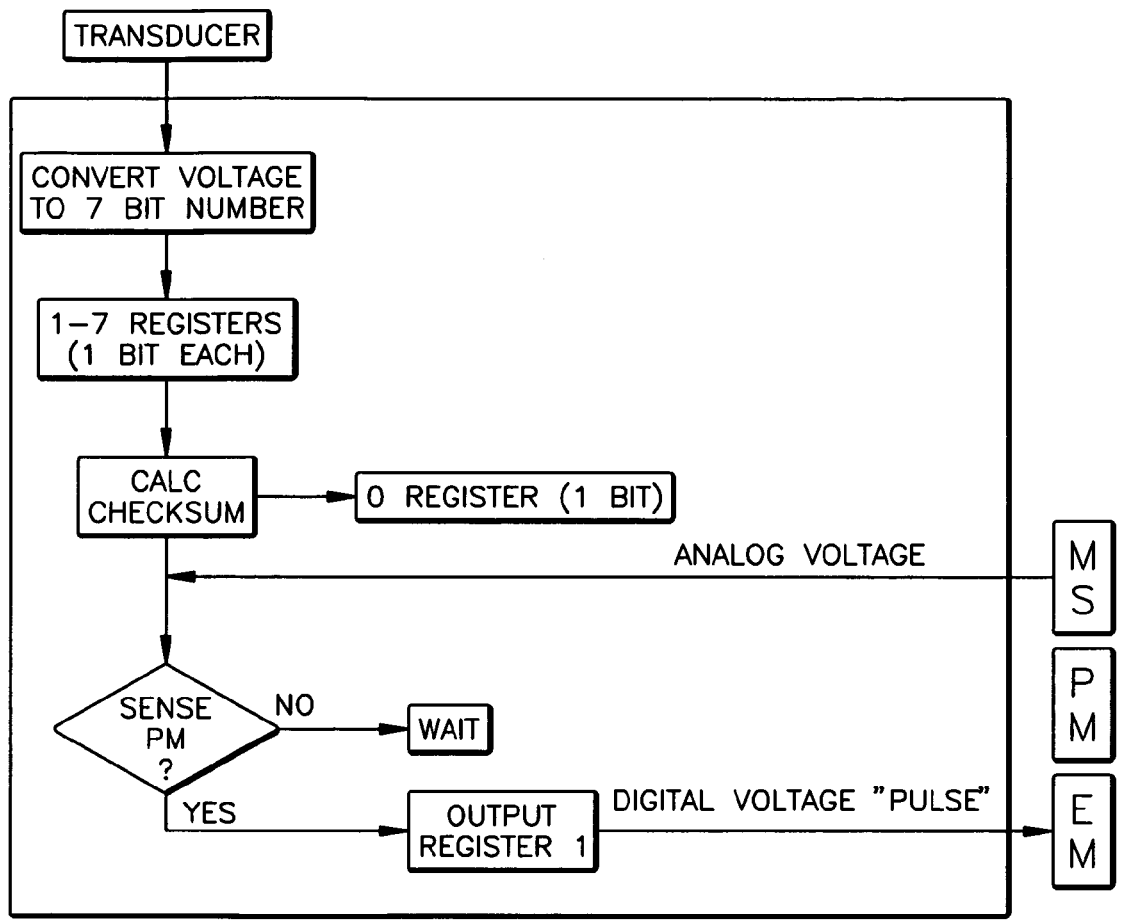
FIG. 5 is a flow chart showing operation within the pressure transducer central processing unit.

Referring to FIGS. 1 and 5, the tire pressure transducer 12 continuously measures tire pressure within the single vehicle tire 20. The measured tire pressure is then converted into a seven bit representation of the pressure reading. The actual measured pressure is preferably within a range of 0 to 2760 millibar (0 to 40 pounds per square inch). The pressure range is adjustable based on the vehicle type and tire type. The seven bit code (128 possible permutations) represents the pressure with an accuracy of plus or minus 20.7 millibar (0.3 pounds per square inch). The precision of the measurement may be increased or decreased by increasing or decreasing the number of bits used to transmit the measured pressure within the limits of the pressure transducer.

The eighth bit in the standard eight bit code is referred to as the checksum bit. The checksum bit, when given a first status ("1"), indicates that the entire pressure signal has been transferred. The checksum bit, when given a second status ("0"), indicates either the system is inoperative or that an operational status indication has been transferred.

As described below, preferably upon each revolution of the vehicle wheel 25 and the tire 20 upon the wheel 25, a pulse, representing data from the tire pressure transducer 12, of one bit of data, is sent by the electromagnet 26. Referring to FIGS. 2 and 5, during each revolution of the wheel 25, the magnet sensor (MS) 22 on the wheel 25 first aligns in close proximity with the permanent magnet (PM) 32 on the vehicle body 30. As a result the wheel's magnet sensor 22 instructs the electromagnet (EM) 26 to send a pulse within a fixed period of time. Next referring to FIG. 3, the magnet sensor (MS) 32 on the vehicle body 30 aligns in close proximity with the permanent magnet (PM) 24 on the wheel 25 or tire 20. As a result, the magnet sensor 32 on the vehicle body 30 is instructed to receive a pulse from the electromagnet 26 on the wheel 25 within the fixed period of time. Referring to FIGS. 1 and 4, as the electromagnet 26 passes the magnet sensor 32 on the vehicle body 30, a one bit pulse of information is transferred from the vehicle wheel 25 to the vehicle frame 30. Specifically, if the electromagnet 26 is activated (receives a signal) during the fixed period of time, the pulse information is read as a "1". If the electromagnet is not activated (i.e. receives no signal) during the fixed period of time, the pulse information is read as "0".

The strength of the permanent magnet is higher than the strength of the electromagnet so these components are not mistaken for one another. The pulse received by the body magnet sensor 32 is transferred to the ECU 16 and held until seven additional pulses are received, one each upon subsequent revolutions of the vehicle wheel 25. When a total of eight pulses are received by the body's magnetic sensor 32, the eighth pulse being the checksum pulse, the ECU 16 then manipulates the eight bit code. The ECU 16 may construct a code from the individual pulses. Alternatively and preferably, the magnetic sensor 32 constructs the code from individual pulses and sends the code to the ECU 16. The code is converted via a lookup table into an electrical signal representative of the pressure and is used to operate one or more displays 18.

The code preferably has a 20.7 millibar (0.30 psi) resolution, although the resolution may be increased or decreased. By utilizing one or more of the bits as redundant checking bits, a repeat of one of the earlier bits transferred in the series of eight, overall accuracy of the system may be improved. However, by utilizing one of the bits as a checking bit or a status bit, the resolution of the system is reduced.

The ECU 16 checks the seven bit code against reference pressure values representative of normally inflated tires. If the measured values differ significantly from the reference pressure values, a warning indication is generated upon the display 18 in the passenger compartment. The ECU 16 also provides a signal representative of the measured pressure that is then displayed digitally or by means of a needle gauge within the vehicle cockpit. The ECU 16 also calculates the rate of change in measured pressures. For example, if the measured pressure drops slightly over a series of one thousand measurements, an indication that a slow leak is present is generated. Alternatively, if a significant pressure drop is recorded over a series of ten measurements, the ECU 16 indicates that a blow out or other catastrophic failure has occurred.

The ECU 16 also compares the change in one tire's pressure to the change in pressure in one or more other tires on the vehicle. The comparison helps to indicate whether gradual changes in tire pressure are a result of air temperature changes within the tire (all tires show a gradual pressure change) or leaks (only one tire shows a pressure change).

By adding additional electromagnets 26 as shown in FIG. 4, alone or in combination with additional magnet sensors 22 and permanent magnets 24 on the wheel perimeter, the number of bits transferred per wheel revolution is increased. Each bit is transferred individually, thus, accuracy is maintained. If only additional electromagnets 26 are used, the pulse sent by the electromagnet 26 to the sensor system is timed by a magnet sensor 22 that earlier sensed the permanent magnet of the sensor system and also timed an earlier electromagnet 26. If for each additional electromagnet 26, an additional permanent magnet 24 and magnet senor 22 are used in the electromagnet system, timing of the additional electromagnet pulse is determined by the additional magnet sensor 22.

Instead of sending eight bit code from the receiving sensor system to the ECU, code having more or less than eight bits may be sent. A code having more than eight bits can provide a more precisely determined tire pressure to be transferred.

In addition to or alternatively of display by digital or needle gauge means, the pressure data may be displayed as a "red/yellow/green" gauge, where red indicates an undesirable pressure situation, green represents a favorable pressure situation and yellow represents a transition situation. Also, by measuring the elapsed time between passages of a single electromagnet, the speed of the vehicle may also be calculated.

The present invention provides an advantage over radio based transmission systems because the energy consumption of the present system is less and the possibility of an undesired vehicle receiving the radio transmissions is minimized. The present invention provides an advantage over other proximity transmission systems in that smaller amounts of data are transferred, thus, minimized the potential for miscommunications.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A vehicle tire pressure monitoring system comprising:
   a tire pressure transducer;
   an electromagnet system supported on a vehicle wheel or tire in electrical communication with the tire pressure transducer, the electromagnet system configured to periodically send single bits of a code representing a tire pressure measured by the transducer;
   a sensor system supported by the vehicle body configured to receive individually the single bits of the code periodically sent from the electromagnetic system; and
   an electronic control unit that receives the code from the sensor system and converts the code into pressure information,
   wherein only one bit of the code representing the tire pressure measured by the transducer is received by the sensor system upon each revolution of the vehicle wheel or tire.

2. A vehicle tire pressure monitoring system comprising:
   a tire pressure transducer;
   an electromagnet system supported on a vehicle wheel or tire in electrical communication with the tire pressure transducer, the electromagnet system configured to periodically send single bits of a code representing a tire pressure measured by the transducer;
   a sensor system supported by the vehicle body configured to receive individually the single bits of the code periodically sent from the electromagnetic system;
   an electronic control unit that receives the code from the sensor system and converts the code into pressure information; and further including a central processing unit that takes an electrical signal generated by the tire pressure transducer and converts the signal into at least a seven bit code.

3. The vehicle tire pressure monitoring system of claim 2, wherein the code is an eight bit code wherein one bit of the eight bit code indicates whether a measured tire pressure is represented by the other seven bits.

4. A vehicle tire pressure monitoring system comprising:
a tire pressure transducer;
an electromagnet system supported on a vehicle wheel or tire in electrical communication with the tire pressure transducer, the electromagnet system configured to periodically send single bits of a code representing a tire pressure measured by the transducer;
a sensor system supported by the vehicle body configured to receive individually the single bits of the code periodically sent from the electromagnetic system; and
an electronic control unit that receives the code from the sensor system and converts the code into pressure information,
wherein the electromagnet system comprises a magnet sensor, permanent magnet and electromagnet and the sensor system comprises a magnet sensor and permanent magnet and wherein:
the sensor system permanent magnet signals the electromagnet system magnet sensor to initiate the electromagnet system to send a pulse representing a single bit of code within a fixed a period of time;
the electromagnet system permanent magnet signals the sensor system magnet sensor to prepare to receive the pulse within the fixed period of time; and
the sensor system magnet sensor receives the pulse that is either a magnetic signal during the fixed period of time or a lack of a magnetic signal during the fixed period of time from the electromagnet within the electromagnet system.

5. The vehicle tire pressure monitoring system of claim 4, wherein only one bit of the code representing the tire pressure measured by the transducer is received by the sensor system upon each revolution of the vehicle wheel or tire.

6. The vehicle tire pressure monitoring system of claim 4, further including a central processing unit that takes an electrical signal generated by the tire pressure transducer and converts the signal into a seven bit code.

7. The vehicle tire pressure monitoring system of claim 4, wherein the electromagnet system further includes a second electromagnet and wherein the sensor system permanent magnet additionally signals the electromagnet system magnet sensor to initiate the second electromagnet to send a second pulse representing a single bit of code from the second electromagnet within a second fixed period of time.

8. The vehicle tire pressure monitoring system of claim 7, wherein both bits of the code representing the tire pressure measured by the transducer are received sequentially by the sensor system upon a single revolution of the vehicle wheel or tire.

9. The vehicle tire pressure monitoring system of claim 4, wherein the electromagnet system further includes a second magnet sensor, second permanent magnet and second electromagnet and wherein the sensor system permanent magnet additionally signals the electromagnet system second magnet sensor to initiate the second electromagnet to send a second pulse representing a single bit of code from the second electromagnet within a second fixed period of time and the electromagnet system second permanent magnet signals the sensor system magnet sensor to prepare to receive a second pulse within a second fixed period of time.

10. The vehicle tire pressure monitoring system of claim 9, wherein both bits of the code representing the tire pressure measured by the transducer are received by the sensor system upon a single revolution of the vehicle wheel or tire.

11. The vehicle tire pressure monitoring system of claim 4, further including a display upon which pressure information from the electronic control unit is shown to the vehicle operator.

12. A vehicle tire pressure monitoring system comprising:
a tire pressure transducer;
an electromagnet system supported on a vehicle wheel or tire in electrical communication with the tire pressure transducer, the electromagnet system configured to periodically send single bits of a code representing a tire pressure measured by the transducer or operational status of the monitoring system;
a sensor system supported by the vehicle body configured to receive individually the single bits of code periodically sent from the electromagnetic system; and
an electronic control unit that receives the code from the sensor system and converts the code into pressure information or status information,
wherein the code is an eight bit code wherein one bit of the eight bit code indicates either a measured tire pressure is represented by the other seven bits or the operational status of the monitoring system is represented by the other seven bits.

13. The vehicle tire pressure monitoring system of claim 12, further including a central processing unit that produces a seven bit code representative of the operational status of the tire pressure monitoring system.

14. A method of monitoring vehicle tire pressure comprising the following steps:
(a) measuring tire pressure;
(b) transferring a single bit of data representing a portion of the measured tire pressure to a sensor system on a vehicle body from an electromagnet system on a wheel or tire;
(c) repeating steps (a) and (b) until a plurality of data bits, which is representative of the pressure within the vehicle tire, is received by the sensor system; and
(d) transferring the plurality of bits from the sensor system to a vehicle electronic control unit,
wherein step (b) occurs only once upon each revolution of the wheel or tire of the vehicle.

15. The method of monitoring vehicle tire pressure of claim 14, wherein steps (a) and (b) are repeated eight times before step (d) is executed.

16. A method of monitoring vehicle tire pressure comprising the following steps:
(a) measuring tire pressure;
(b) transferring a single bit of data representing a portion of the measured tire pressure to a sensor system on a vehicle body from an electromagnet system on a wheel or tire;
(c) repeating steps (a) and (b) until a plurality of data bits, which is representative of the pressure within the vehicle tire, is received by the sensor system; and
(d) transferring the plurality of bits from the sensor system to a vehicle electronic control unit
(e) converting the bit code received from the pulse sensor into pressure information; and repeating steps (a) through (d) at least ten times and generating an indication that a blow out or other catastrophic failure has occurred if the magnitude of the pressure information recorded drops more than fifty percent over a series of ten measurements.

17. The method of claim 16, further including the steps of checking the tire pressure information against reference pressure values representative of normally inflated tires and generating a warning signal if the measured values differ from the reference pressure values.

18. A vehicle tire pressure monitoring system comprising:
a tire pressure transducer;
an electromagnet system supported on a vehicle wheel or tire in electrical communication with the tire pressure transducer, the electromagnet system configured to periodically send single bits of a code representing a tire pressure measured by the transducer;
a sensor system supported by the vehicle body adjacent to, but not on the wheel or tire, and configured to receive individually the single bits of the code periodically sent from the electromagnetic system; and
an electronic control unit that receives the code from the sensor system and converts the code into pressure information,
wherein only one bit of the code representing the tire pressure measured by the transducer is received by the sensor system upon each revolution of the vehicle wheel or tire, such that when an error occurs while sending the single bit of code during a revolution of the wheel or tire, successive revolutions of the wheel or tire do not send more than one bit of code to compensate for the error of a previous revolution.

* * * * *